United States Patent [19]

Wessolowski et al.

[11] Patent Number: 4,677,860
[45] Date of Patent: Jul. 7, 1987

[54] YARN TENSION SENSOR

[75] Inventors: Bernd Wessolowski, Remscheid; Wilfried Mink, Wuppertal-Ronsdorf, both of Fed. Rep. of Germany

[73] Assignee: Barmag AG, Remscheid, Fed. Rep. of Germany

[21] Appl. No.: 833,906

[22] Filed: Feb. 26, 1986

[30] Foreign Application Priority Data

Feb. 27, 1985 [DE] Fed. Rep. of Germany ....... 3506897
Jun. 21, 1985 [DE] Fed. Rep. of Germany ....... 3522239

[51] Int. Cl.$^4$ ..................... G01L 5/10; G01L 25/00
[52] U.S. Cl. .................................. 73/862.48; 73/1 B
[58] Field of Search ............ 73/1 B, 862.45, 862.47, 73/862.48

[56] References Cited

U.S. PATENT DOCUMENTS

| | | | |
|---|---|---|---|
| 2,159,969 | 5/1939 | Fürst | 73/862.47 |
| 2,383,537 | 8/1945 | Elvin et al. | 73/862.45 |
| 2,407,545 | 9/1946 | Fish | 73/1 B X |
| 2,809,519 | 10/1957 | Kaestner | 73/862.48 X |
| 3,005,332 | 10/1961 | McClintock | 73/1 B |
| 3,206,972 | 9/1965 | Brys | 73/862.45 |
| 3,376,738 | 4/1968 | Biffle | 73/862.45 X |
| 3,771,346 | 11/1973 | Huslin, Jr. | 73/1 B |
| 3,880,001 | 4/1975 | Hogan | 73/862.45 X |
| 4,182,167 | 1/1980 | Nokoyama et al. | 73/862.45 |
| 4,182,169 | 1/1980 | Bardy | 73/862.45 X |

FOREIGN PATENT DOCUMENTS

| | | | |
|---|---|---|---|
| 1075095 | 4/1980 | Canada | 73/862.45 |
| 133079 | 4/1933 | Fed. Rep. of Germany | 73/862.47 |
| 782015 | 8/1957 | United Kingdom | 73/862.45 |
| 1330592 | 9/1973 | United Kingdom | 73/1 B |
| 398843 | 9/1973 | U.S.S.R. | 73/862.48 |
| 609988 | 6/1978 | U.S.S.R. | 73/862.45 |

OTHER PUBLICATIONS

"Magnetic Fluid Seals"; *Laser Focus Magazine*, Apr. 1979; 4 page reprint of pp. 56–63; Kuldip Raj et al.
"Tension Sensor for Flexible Media"; *IBM Technical Disclosure Bulletin;* vol. 15, No. 7, pp. 2257–2258; M. L. Nettles.

*Primary Examiner*—Stewart J. Levy
*Assistant Examiner*—Tom Noland
*Attorney, Agent, or Firm*—Bell, Seltzer, Park & Gibson

[57] ABSTRACT

A yarn tension sensor is disclosed which is adapted for use with a textile yarn processing machine. The sensor includes a spring arm which is contacted by a running yarn, and such that the tension in the yarn acts to deflect the arm. In order to render the deflection of the arm relatively insensitive to external or machine vibrations, while permitting an accurate response to fluctuations in yarn tension, there is provided a structure for damping the spring arm, which includes a magnetic fluid having a portion of the spring arm immersed therein.

27 Claims, 7 Drawing Figures

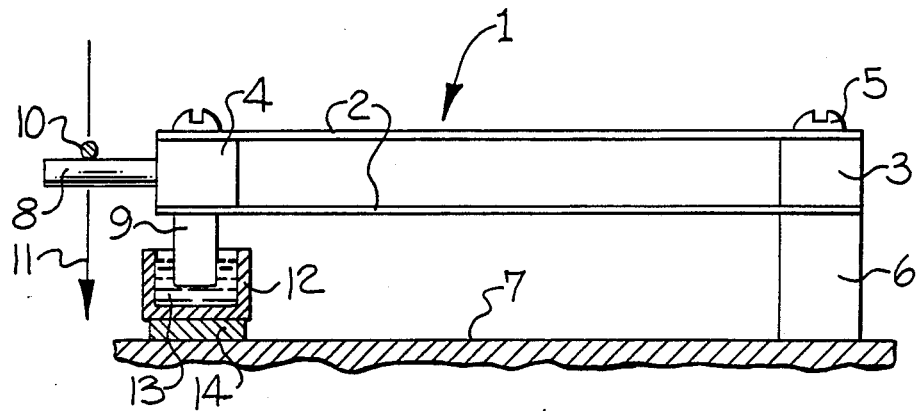
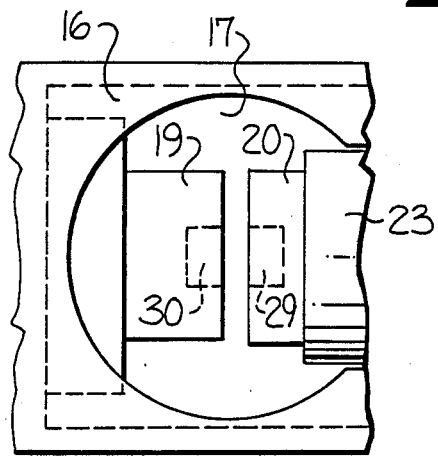
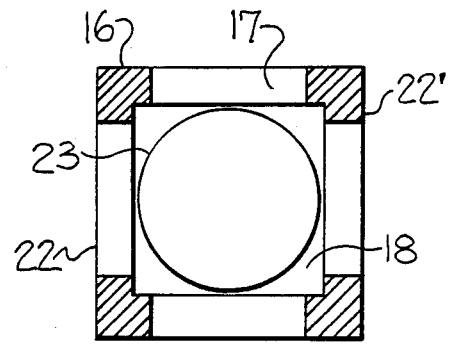
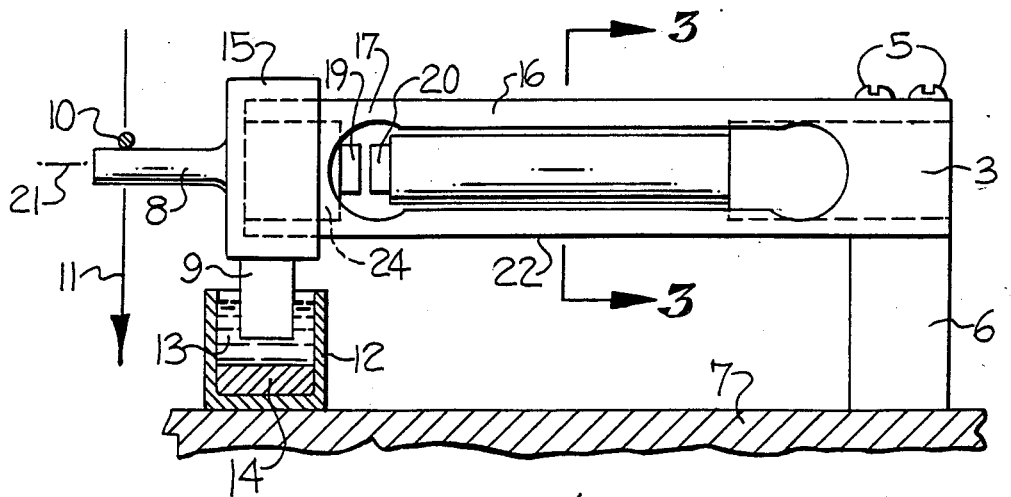

YARN TENSION SENSOR

BACKGROUND OF THE INVENTION

The present invention relates to a yarn tension sensor adapted for use with a textile yarn processing machine.

In the production and processing of multi-filament yarns, such as the false twist texturing operation, the yarn tension is an important process parameter. Specifically, temporary fluctuations of the yarn tension will have a significant influence on the quality of the yarn, and for this reason, a satisfactory yarn tension sensor must have an adequately high natural frequency so as to be adapted to follow the frequency of the fluctuations of the tension. This requirement presents difficulties, however, since the vibrations of the machine itself may lead to oscillations of the tension sensor.

It is accordingly an object of the present invention to provide a yarn tension sensor which is able to follow the fluctuations of the yarn tension, and which is relatively insensitive to machine vibrations and other external disturbances.

SUMMARY OF THE INVENTION

This and other objects and advantages of the present invention are achieved in the embodiments illustrated herein by the provision of a yarn tension sensor which comprises an elongate spring arm having one end adapted to be fixedly mounted to a textile yarn processing machine and an opposite free end which is deflectable in a predetermined deflecting direction with respect to the machine, and guide surface means mounted adjacent to the free end of the arm for engaging a running yarn, and such that the tension in the running yarn acts to deflect the free end of said spring arm in the deflecting direction. The sensor also includes means for damping the movement of the free end of the spring arm, with the damping means including a receptacle supporting a magnetic fluid, and with the spring arm having a portion thereof immersed in the magnetic fluid. By this arrangement, the movements of the spring arm are dampened, irrespective of the deflected position of the arm.

In one embodiment, the portion of the spring arm which is immersed in the magnetic fluid comprises a projection mounted at the free end of the spring arm, and which takes the form of a damping piston which extends in the direction of deflection. Also, the receptacle of the magnetic fluid comprises an open cup-like member which is mounted in alignment with the free end of the spring arm, and so that the projection extends into the receptacle so as to be immersed in the magnetic fluid. Also, a magnet, such as a permanent magnet, is preferably positioned adjacent the bottom of the receptacle to hold the magnetic material in place. Further, it is preferred that the projection and the receptacle be made of a non-magnetic material.

An advantage resulting from the use of a magnetic fluid resides in the fact that the sensor can be mounted in any orientation. For example, in a yarn false twisting machine, the yarns normally run in a vertical direction, either up or down, and the sensor of the present invention may be mounted either horizontally or vertically, and with the deflecting direction in either case being horizontal.

The spring arm may take the form of a pair of parallel, spring plates which are interconnected at each of the opposite ends, with the free end of the arm mounting the yarn guide surface means as well as the projection or damping piston adapted to be immersed in the magnetic fluid contained in a receptacle as described above. Here again, a magnet is preferably mounted adjacent the bottom of the receptacle, either below the receptacle or in its interior, to hold the magnetic fluid in place. In this embodiment, the free end of the spring arm is movable only in the deflecting direction, and as a result, the direction of the reaction force acting on the yarn does not change.

In another embodiment of the present invention, the receptacle for the magnetic fluid has opposite side walls with aligned openings extending therethrough, and the spring arm extends through the openings in the side walls. The openings in the side walls are sized to permit the deflecting movement of the spring arm, and suitable magnets are positioned on the other opposing side walls of the fluid receptacle so as to retain the magnetic fluid within the receptacle.

The extent of the deflection of the spring arm may be determined by suitable measuring instruments, such as for example strain gauges. However, the present invention contemplates a measuring system which is essentially independent of temperature changes, and which comprises a deflection measuring instrument which directly measures the distance of the deflection of the spring arm. In particular, the deflection measuring instrument of the present invention takes the form of a cooperating arrangement of an optical signal transmitting means or emitter and an optical signal receiving means or receiver, and wherein the quantity of the received signal varies with the extent of the deflection.

In one illustrated embodiment, the optical emitter and the optical receiver of the deflection measuring instrument are respectively mounted to the free end of the spring arm, and a support member which is mounted to the fixed end of the spring arm. In another embodiment, the emitter and receiver are mounted to a common support member, and the support member is fixedly mounted to the fixed end of the spring arm. Also, a reflector, such as an optical prism, is mounted to the free end of the arm. In this latter arrangement, it is preferable that the reflecting angle of the prism differs slightly from 90°, and also it is preferable that the longitudinal distance between the reflector and the support for the emitter and receiver be adjustable. This adjustment provides for a "zero-balance" calibration in a simple manner. In particular, a temperature change will be understood to effect a change in the relative distance between the reflector and the support member for the emitter and receiver, and the received quantity of the signal will also change since the reflected signals do not extend parallel to the emitted signals. Temperature compensation may thus be carried out by adjusting the relative distance between the reflector and support member for the emitter and receiver so that the output signal may be calibrated to the unloaded condition. With a prism having a reflecting angle of exactly 90°, the reflected signals and emitted signals would be parallel, and thus there would be no change in the received signals upon a change in separation distance.

A further embodiment of the present invention relates to a specific construction of the spring arm which comprises a unitary hollow casing having a rectangular or square outline in cross section. The side walls of the casing which extend parallel to the direction of the deflection, i.e. parallel to the direction in which the yarn tension is operative on the yarn sensor, each include elongate openings formed therein to facilitate the deflection of the bar. The elongate openings are "bone shaped" in outline, which is here understood to mean the openings have elongate parallel side edges which extend along a major portion of the length of the bar, and a generally circular enlargement at each of the ends thereof. Also, the distance measuring instrument as described above may be mounted within the casing and extend from the fixed end to a location closely adjacent the free end of the arm. The yarn guide surface is mounted adjacent the free end of the casing and takes the form of an extension which extends along the central longitudinal axis of the casing. Where the deflection measuring instrument includes a reflecting prism as described above, the reflecting prism may be mounted within the casing adjacent the free end, and the support member of the deflection measuring instrument is preferably made of the same material as the casing for the purpose of temperature compensation. In a further embodiment, the other two sides of the casing may also be provided with openings, so as to adapt the characteristic curve of the spring bar and thus the measured deflections of the casing to the anticipated yarn tensions.

With respect to the above embodiment, the casing may mount a projection in the form of a damping piston adjacent the free end thereof, and which extends in the direction of the deflection and which is immersed in a magnetic fluid positioned in an open cup-like receptacle in the manner described above. Here again, a magnet, such as a permanent magnet, may be positioned on the bottom of the receptacle or in its interior, and it is also advantageous to make the receptacle which contains the magnetic fluid of a non-magnetic material.

The yarn tension sensor of the present invention is adapted to measure high frequency fluctuations of the tension, of for example 30-40 Hz. The measuring range may be further expanded by the use of a measuring amplifier, having a characteristic curve which rises in the range of the natural frequency of the yarn sensor, and which as a result compensates either wholly or in part the frequency dependent characteristic curve of the yarn sensor.

BRIEF DESCRIPTION OF THE DRAWINGS

Some of the objects and advantages of the present invention having been stated, others will appear as the description proceeds when taken in the conjunction with the accompanying drawings, in which FIG. 1 is a partly sectioned top plan view of a yarn tension sensor which embodies the features of the present invention;

FIG. 2 is a view similar to FIG. 1 but illustrating a second embodiment of the invention;

FIG. 2A is an enlarged fragmentary view of a portion of the sensor shown in FIG. 2.

FIG. 3 is a sectional view taken substantially along the line 3—3 of FIG. 2;

DETAILED DESCRIPTION OF THE PREFERRED EMBODIMENTS

Figure 4:
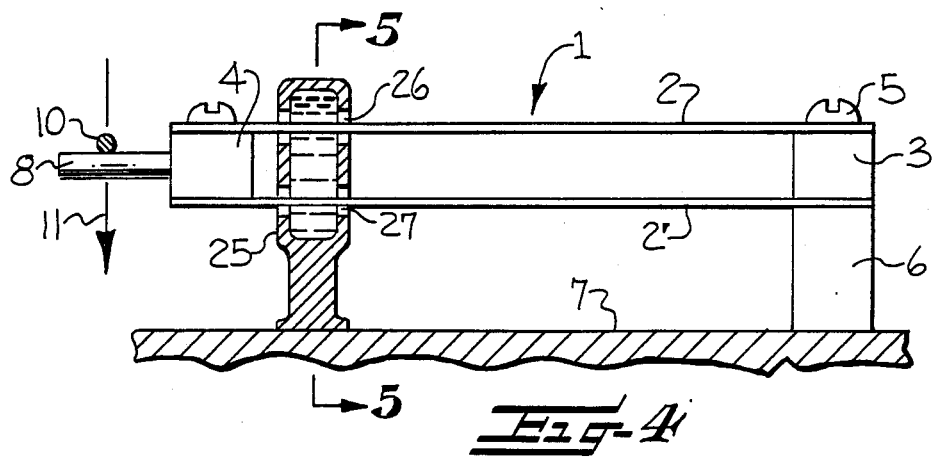
FIG. 4 is a view similar to FIG. 1 and illustrating still another embodiment of the present invention.

Referring more particularly to the drawings, FIG. 1 illustrates a yarn tension sensor 1 which embodies the features of the present invention, and which comprises an elongate spring arm consisting of a pair of identical, parallel flat spring plates 2, 2' which are interconnected at respective opposite ends by the intermediate blocks 3 and 4. A mounting spacer 6 is positioned at the end of the arm which includes the block 3, and this end is fixed to the frame 7 by means of the bolts 5. The frame 7 typically comprises a portion of the frame of a textile yarn processing machine. The opposite or free end of the arm, and which includes the block 4, mounts a yarn guide surface 8 which extends in the direction of the arm. Also, a projection or damping piston 9 is mounted to the free end of the arm and extends in the direction of the force 11 applied by the tension of the running yarn 10, i.e., the direction in which the yarn tension is operative on the guide surface 8. As noted above, the spring arm usually would be mounted either vertically or horizontally, with the direction of deflection 11 being horizontal so as to permit engagement with a vertically running yarn. In addition, when the spring arm is mounted so as to extend horizontally, the deflection direction extends in a horizontal direction which is perpendicular to the horizontal direction of the spring arm. A receptacle 12, which has the form of an open cup, is positioned in alignment with the free end of the arm, and the receptacle 12 is substantially filled with a magnetic fluid 13. In the embodiment of FIG. 1, the receptacle 12 is placed on a magnet 14, preferably a permanent magnet, and the receptacle and magnet are fixedly mounted to the frame 7. The yarn 10, which is shown contacting the guide surface 8, may also be guided through a guide opening (not shown) which is positioned adjacent the guide surface 8.

Magnetic fluids which are adapted for use with the present invention are well known in the art, and are commonly called "ferrofluids" in the literature. Such fluids are a dispersion of extremely small particles of magnetic materials, for example, $Fe_3O_4$, which are suspended in a carrier fluid such as kerosene or silicon oils. Magnetic fluids may be purchased from Ferrofluidics Corporation of Nashua, N.H. Further information can be found, for example, in U.S. Pat. No. 4,107,063 and in "Magnetic-fluid seals", published in Laser Focus Magazine, April 1979, pp. 56–63, Advanced Technology Publications, 1001 Watertown St., Newton, MA 02165.

Another embodiment of the present invention is illustrated in FIGS. 2, 2A and 3. This embodiment incorporates a deflection measuring instrument as further described below, and by reason of the relatively high sensitivity of this instrument, the elasticity constant of the sensor can be relatively high, and as a result thereof the natural frequency is also relatively high. As a result, high frequency fluctuations of the yarn tension may be detected. In particular, the illustrated damping means, which comprises the piston 9, receptacle 12, and magnetic fluid 13, permits the detection of fluctuations in the yarn tension at frequencies in the range of about 50 Hz, where an essentially inertia-less deflection measuring instrument of the type described below is employed. The compensation of the frequency response characteristic of the sensor by means of an amplifier with a frequency compensation, permits the sensor to detect tension frequencies of several hundred Hertz.

Referring again to the embodiment of FIGS. 2, 2A and 3, the illustrated spring arm comprises a unitary hollow casing 16 having a rectangular outline in cross section, with the casing having two opposite side walls 22, 22' (FIG. 3) which lie in parallel planes which are parallel to the deflection direction. The end of the casing 16 which includes the block 3 is fixedly mounted to the spacer 6 and frame 7 by means of bolts 5, whereas the free end of the casing mounts a head 15 having a yarn guide surface 8 and a projection or damping piston 9 mounted thereto. The two opposite side walls 22, 22' of the casing 16 each include elongate openings 17 formed therein to facilitate the deflection of the casing. The elongate openings 17 are symmetrically configured, and each opening comprises parallel side edges which extend along a major portion of the length of the casing, and a generally circular enlargement at each of the ends thereof. The diameter of the enlargements correspond to the inside cross sectional dimension of the casing 16 in the illustrated embodiment. As a result, the openings may be said to be "bone-shaped", and the cross section of the casing exhibits a reduced bending resistance adjacent the centers of the circular enlargements. As best seen in FIG. 3, the top and bottom walls of the casing also contain similar openings 17 for the purpose of favorably influencing the rigidity of the casing.

The damping piston 9 is immersed in the magnetic fluid 13 in the receptacle 12, so that the oscillations generated by the machine are damped. The magnetic fluid is stabilized and retained in the receptacle 12 with the aid of the magnet 14, which is preferably a permanent magnet, and which renders the yarn tension sensor of the present invention independent of deflected position.

A deflection measuring instrument is rigidly mounted inside the casing, and the instrument includes a support member 23 which extends longitudinally from the fixed end of the arm to a location closely adjacent the head 15 at the free end of the arm. A mounting head 19 is mounted in alignment with the support member 23, and the head 19 is secured inside the casing adjacent the free end, and such that the head 19 follows the movements caused by the yarn tension. A mounting head 20 is mounted at the free end of the support member 23, and the mounting head 20 in turn mounts a source of radiation 29. Also, a receiver 30 is mounted on the head 19. The radiation source 29 and receiver 30 are further described below with respect to FIG. 6, and they provide an essentially inertialess scanning of the deflecting movements, and a reliable measuring is possible, even at high frequencies of yarn tension fluctuations.

Although the illustrated embodiment of FIG. 1 makes no mention of a similar yarn tension measuring instrument, it will be understood that a similar instrument could be employed with the embodiment of FIG. 1. In such case, the support member 23 would be rigidly mounted between the two leaf springs 2, 2' at the fixed end adjacent the block 3, whereas the measuring head 19 would be secured to the block 4. It will be understood however that other suitable deflection measuring instruments, such as a pneumatic system could be employed.

Preferably, the damping piston or projection 9 and the receptacle 12 are made of a non-magnetic material. To avoid different coefficients of thermal expansion, it is advantageous to make the intermediate blocks 3 and 4 as shown in FIG. 1, and similarly the casing 16 and holder 24 and support member 23 as seen in FIG. 2, of the same material.

The damping means of the present invention can be used to successfully suppress measuring errors caused by the natural oscillation of the yarn sensor, in all yarn tension measuring devices in which the relative movement is detected between a yarn sensor moved by the yarn tension relative to its mounting support.

Figure 5:
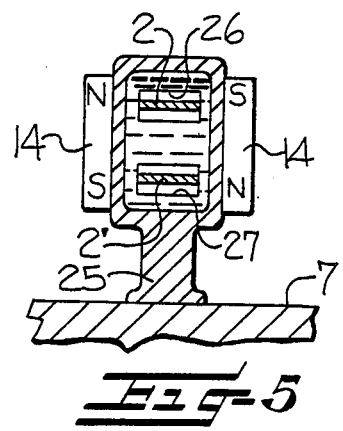
FIG. 5 is a cross sectional view taken substantially along the line 5—5 of FIG. 4.

In the embodiment of FIGS. 4 and 5, the spring arm of the sensor again comprises two parallel leaf springs or plates 2, 2', which extend horizontally through a damping chamber receptacle 25. The two spring plates are fixedly held to the frame 7 at the right end of the spring arm as seen in FIG. 4 by the block 3, spacer 6, and bolt 5. The yarn 10 is guided into contact with the guide surface 8, and the guide surface 8 is attached to the free end adjacent the block 4. Deflection measuring instruments, such as strain gauges may be disposed on the spring arm to measure the deflection in the direction of the force 11. Also, the damping receptacle 25 includes opposite side walls with aligned pairs of openings 26, 27 extending therethrough, and the spring plates 2, 2' extend through respective ones of the openings in each side wall. These openings closely enclose the cross section of the spring plates 2, 2', but only to the extent that the spring plates are permitted to move unhindered in the direction 11. The receptacle 25 is completely filled with a magnetic fluid, and permanent magnets 14 are mounted on opposite sides of the receptacle for retaining the fluid therein, note FIG. 5.

Figure 6:
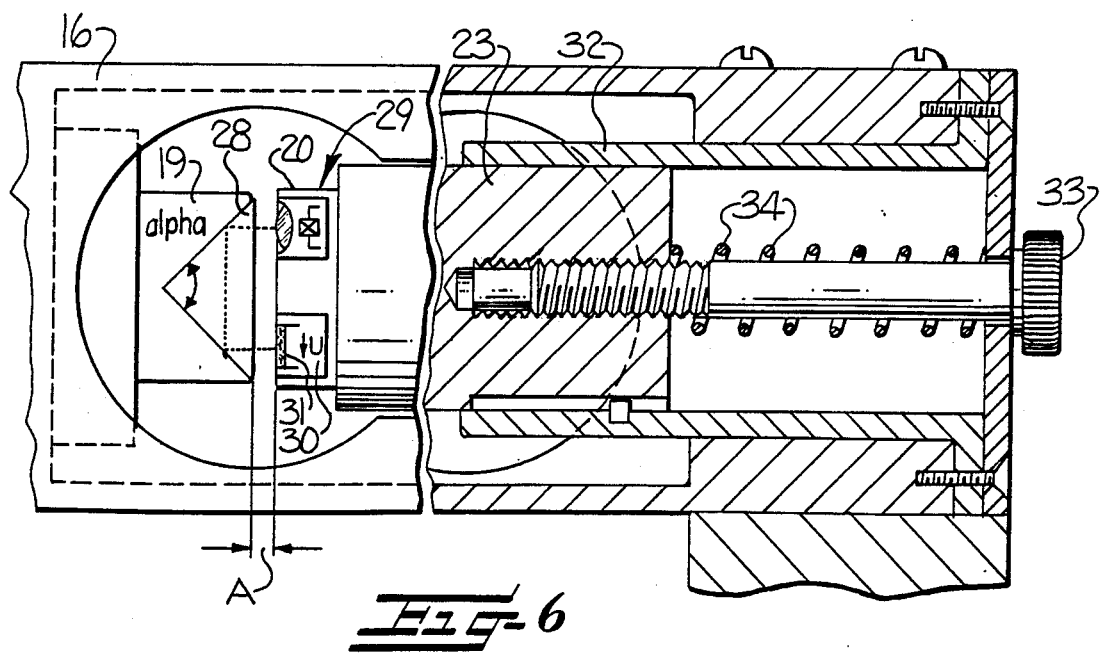
FIG. 6 is a sectional view of the distance measuring instrument which is shown in the embodiment of FIG. 3.

Another embodiment of the deflection measuring instrument of the present invention is illustrated in greater detail in FIG. 6. Specifically, the instrument includes the support member 23, which mounts the head 20 at the forward end thereof. The opposite or right hand end of the support member 23 is slideably mounted in the support guide 32, and the support guide 32 is fixedly mounted to the fixed end of the support arm.

The mounting head 19 is fixed to the head 15 at the free end of the arm, and mounts a prism 28. The prism includes a reflecting angle alpha which is slightly less than 90°. The mounting head 20 mounts a source of radiation 29 and a receiver 30. The source of radiation may, for example be a source of light, and the receiver may be a photo diode 31. Since the reflecting angle alpha is not equal to 90°, the emitted light beams are not parallel to the reflected beams, and as a result, the reflected beams strike the center of the photo diode 31 to produce the optimum measured deflection, represented by the voltage U, only at a predetermined distance A between the heads 19 and 20. This measured deflection is entered as a calibrated signal of the unloaded condition of the yarn sensor, and if the distance A changes because of temperature fluctuations and the corresponding expansion of the casing 16 and support member 23, there thus results a different calibrated signal U at zero load. The effect of the temperature may be equalized by displacing the support member 23 in the guide 32, until the calibrated signal U is restored. To this end, the support member 23 is slideably mounted in the guide 32, and to displace the support member, an adjusting screw 33 is provided. In particular, the adjusting screw 33 is rotatably supported in the guide and threadedly engages the support 23, and the support member 23 is biased on its rear side by a compression spring 34.

In the drawings and specification, there has been set forth a preferred embodiment of the invention, and although specific terms are employed, they are used in a generic and descriptive sense only and not for purposes of limitation.

That which is claimed is:

1. A yarn tension sensor adapted for use with a textile yarn processing machine and comprising
an elongate spring arm having one end adapted to be fixedly mounted to a textile yarn processing machine and an opposite free end which is deflectable in a predetermined deflecting direction with respect to said machine,
guide surface means mounted to the free end of said arm for engaging a running yarn, and such that the tension in the running yarn acts to deflect the free end of said spring arm in said deflecting direction, and
means for damping the deflecting movement of said free end of said spring arm, said damping means including a receptacle supporting a magnetic fluid, and with said spring arm having a portion thereof immersed in said magnetic fluid.

2. The yarn tension sensor as defined in claim 1 wherein said spring arm comprises a pair of parallel, spring plates, with the spring plates lying in respective parallel planes which are perpendicular to said deflecting direction and which are separated from each other in said deflecting direction, and with said spring plates being interconnected to each other at said one end and at said free end.

3. The yarn tension sensor as defined in claim 2 wherein said receptacle is cup-shaped and mounted adjacent said free end of said spring arm, and said portion of said spring arm which is immersed in said magnetic fluid comprises a projection mounted at said free end and extending into said receptacle so as to be immersed in said magnetic fluid.

4. The yarn tension sensor as defined in claim 3 wherein said spring arm is mounted so that said deflecting direction extends horizontally.

5. The yarn tension sensor as defined in claim 2 wherein said spring plates are mounted horizontally and so that said deflecting direction extends in a horizontal direction which is perpendicular to the horizontal direction of said spring plates, and wherein said receptacle is cup-shaped and mounted in alignment with said free end of said spring arm, and said portion of said spring arm which is immersed in said magnetic fluid comprises a projection mounted at said free end and extending into said receptacle so as to be immersed in said magnetic fluid.

6. The yarn tension sensor as defined in claim 5 wherein said damping means further includes a magnet for retaining said magnetic fluid in said receptacle.

7. The yarn tension sensor as defined in claim 6 wherein said projection is composed of a non-magnetic material.

8. The yarn tension sensor as defined in claim 2 wherein said receptacle includes opposite side walls with aligned openings extending therethrough, and wherein said spring plates extend through respective ones of said openings.

9. The yarn tension sensor as defined in claim 8 wherein said damping means further includes a magnet for retaining said magnetic fluid in said receptacle.

10. The yarn tension sensor as defined in claim 1 wherein said spring arm comprises a unitary hollow casing having a rectangular outline in cross section, with said casing having two opposite side walls which lie in parallel planes which are parallel to said deflecting direction, and wherein said two opposite side walls each include an elongate opening formed therein to facilitate the deflection of said arm.

11. The yarn tension sensor as defined in claim 10 wherein said elongate openings are symmetrically configured, and wherein each opening comprises parallel side edges which extend along a major portion of the length of said arm, and a generally circular enlargement at each of the ends thereof.

12. The yarn tension sensor as defined in claim 10 wherein said receptacle is cup-shaped and mounted adjacent said free end of said spring arm, and said portion of said spring arm which is immersed in said magnetic fluid comprises a projection mounted at said free end and extending into said receptacle so as to be immersed in said magnetic fluid.

13. The yarn tension sensor as defined in claim 12 wherein said spring arm is mounted so that said deflecting direction extends horizontally.

14. The yarn tension sensor as defined in claim 10 wherein said casing is mounted horizontally and so that said deflecting direction extends in a horizontal direction which is perpendicular to the horizontal direction of said spring plates, and wherein said receptacle is cup-shaped and mounted in alignment with said free end of said spring arm, and said portion of said spring arm which is immersed in said magnetic fluid comprises a projection mounted at said free end and extending into said receptacle so as to be immersed in said magnetic fluid.

15. The yarn tension sensor as defined in claim 1 further comprising deflection measuring means for continuously measuring the extent of the deflection of said free end of said spring arm, to thereby measure the instantaneous tension in the running yarn.

16. The yarn tension sensor as defined in claim 15 wherein said deflection measuring means comprises a support member mounted to said arm adjacent said one fixed end, said support member mounting means for transmitting an optical signal toward said free end and means for receiving an optical signal from said free end, and reflector means mounted to said free end of said arm for reflecting the optical signal from said transmitting means to said receiving means.

17. The yarn tension sensor as defined in claim 16 wherein said reflector means comprises a reflecting prism, with said reflecting prism having a reflecting angle which is different from 90°, so that any relative movement of said support member and said reflector means causes the magnitude of the optical signal received by said receiving means to change.

18. The yarn tension sensor as defined in claim 17 further comprising means for adjusting the separation distance between said support member and said reflector means, to permit the deflection measuring means to be calibrated.

19. A yarn tension sensor adapted for use with a textile yarn processing machine and comprising
an elongate spring arm having one end adapted to be fixedly mounted to a textile yarn processing machine, and an opposite free end which is deflectable in a predetermined deflecting direction with respect to said machine, said spring arm comprising a unitary hollow casing having a rectangular outline in cross section, with said casing having two opposite side walls which lie in parallel planes which are parallel to said deflecting direction, and wherein said two opposite side walls each include an elongate opening formed therein to facilitate the deflection of said arm, guide surface means mounted to the free end of said arm for engaging a running yarn, and such that the tension in the running yarn acts to deflect the free end of said spring in said deflecting direction, and deflection measuring means mounted to said spring arm for continuously measuring the extent of the deflection of said free end of said spring arm, to thereby measure the instantaneous tension in the running yarn.

20. The yarn tension sensor as defined in claim 19 wherein said deflection measuring means comprises a support member mounted to said one fixed end of said spring arm and positioned within said casing and extending from said one fixed end to a location closely adjacent said free end, and means for measuring the relative movement between said support member and the free end of said spring arm.

21. The yarn tension sensor as defined in claim 20 wherein said means for measuring the relative movement comprises an optical transmitter and a corresponding optical receiver, with one being mounted to the free end of said spring arm and the other being mounted to said support member.

22. The yarn tension sensor as defined in claim 20 wherein said means for measuring the relative movement comprises means mounted on said support member for transmitting an optical signal toward said free end and means mounted on said support member for receiving an optical signal from said free end, and reflector means mounted to said free end of said arm for reflecting the optical signal from said transmitting means to said receiving means.

23. The yarn tension sensor as defined in claim 22 wherein said reflector means comprises a reflecting prism, with said reflecting prism having a reflecting angle which is different from 90°, so that relative movement of said support member and said reflector means in said deflecting direction causes the magnitude of the optical signal received by said receiving means to change.

24. The yarn tension sensor as defined in claim 23 further comprising means for adjusting the separation distance between said support member and said reflector means, to permit the deflection measuring means to be calibrated.

25. The yarn tension sensor as defined in claim 19 wherein said casing includes two other opposite side walls, and wherein said two other opposite side walls each include an elongate opening formed therein.

26. A yarn tension sensor adapted for use with a textile yarn processing machine and comprising an elongate spring arm having one end adapted to be fixedly mounted to a textile yarn processing machine, and an opposite free end which is deflectable in a predetermined deflecting direction with respect to said machine, guide·surface means mounted to the free end of said arm for engaging a running yarn, and such that the tension in the running yarn acts to deflect the free end of said spring arm in said deflecting direction, and deflection measuring means mounted to said spring arm for continuously measuring the extent of the deflection of said free end of said spring arm to thereby measure the instantaneous tension in the running yarn, said deflection measuring means comprising a support member mounted to said one fixed end of said spring arm, transmitting means for transmitting an optical signal along a direction parallel to the spring arm and receiving means for receiving an optical signal extending in an opposite direction, said transmitting means and said receiving means both being mounted to one of said support member and said free end, and reflector means mounted to the other of said support member and said free end for reflecting the optical signal from said transmitting means to said receiving means, said reflector means comprising a reflecting prism, with said reflecting prism having a reflecting angle which is different from 90°, so that relative movement of said transmitting means and said receiving means with respect to said reflector means in said reflecting direction causes the magnitude of the optical signal received by said receiving means to change.

27. The yarn tension sensor as defined in claim 26 further comprising means for adjusting the separation distance between said support member and said free end, to permit the deflection measuring means to be calibrated.

* * * * *